(12) United States Patent
Sone

(10) Patent No.: US 7,324,245 B2
(45) Date of Patent: Jan. 29, 2008

(54) ROTATING DRIVING APPARATUS AND IMAGE READING APPARATUS

(75) Inventor: Toshihiro Sone, Fujieda (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1059 days.

(21) Appl. No.: 10/390,009

(22) Filed: Mar. 18, 2003

(65) Prior Publication Data
US 2004/0184117 A1 Sep. 23, 2004

(51) Int. Cl.
*H04N 1/04* (2006.01)
*G05B 19/40* (2006.01)
*H02P 8/00* (2006.01)

(52) U.S. Cl. ............... 358/471; 358/474; 358/486; 358/497; 318/685; 318/696

(58) Field of Classification Search ............... 358/497, 358/474, 486, 471, 400, 500; 318/685, 696; 399/212, 211
See application file for complete search history.

(56) References Cited

FOREIGN PATENT DOCUMENTS

| JP | 5-072836 A | 3/1993 |
| JP | 06130750 A * | 5/1994 |
| JP | 8-063041 A | 3/1996 |
| JP | 08115041 A * | 5/1996 |
| JP | 2000-240726 A | 9/2000 |

* cited by examiner

*Primary Examiner*—Cheukfan Lee
(74) *Attorney, Agent, or Firm*—Foley & Lardner LLP

(57) ABSTRACT

In the present invention, an image reading apparatus and the like which is provided with a driving device (21) capable of changing its rotational speed, includes an inertial load changing device 26 for changing the inertial load of a rotating body (23) of the driving device (21). The inertial load changing device 26 includes an inertial body (27) which is adjacently disposed to the rotating body (23) and an interlock unit 28 for attaching the inertial body 27 to the rotating body 23 to create an integral rotation so as to change the inertial load of the rotating body (27). The inertial bodies is provided by single or plural number. The plural number of inertial bodies (27) is individually attached to the rotating body (23) by means of the interlock unit 28 in order to change the inertial load of the rotating body in several levels.

7 Claims, 6 Drawing Sheets

ROTATING DRIVING APPARATUS AND IMAGE READING APPARATUS

BACKGROUND OF THE INVENTION

The present invention relates to a rotating driving apparatus and an image reading apparatus for reading an image information, and forming and transferring a latent image onto a piece of paper. More specifically, the present invention relates to a rotating driving apparatus and an image reading apparatus capable of resolving a problem of a blurred image.

Generally, in an image reading apparatus incorporated in an image forming apparatus such as a copying machine, a carriage move reading method is employed as a technique for reading the image of an original document, in which a carriage moves and reads the original document. An example of the carriage move reading method is shown in FIG. 1. FIG. 1 is a schematic lateral view of the image reading apparatus which employs a carriage move reading method.

The image reading apparatus 1 mainly comprises a first carriage 2, a second carriage 3, a lens 4, a CCD sensor 5, and a reading apparatus control board 6.

The first carriage 2 which is provided with the first mirror 8, changes the angle of the image information of the original document placed on an original document panel glass by 90 degree, namely, from perpendicular to parallel so as to reflect the image on the second carriage 3. The second carriage 3 which is provided with a second mirror 9 and a third mirror 10, changes the angle of the image information received from the first carriage 2 by 180 degree, that is, from parallel to perpendicular, and further to parallel so as to reflect the image on the lens 4. The first carriage 2 and the second carriage 3 are supported by a transporting device (not shown) so that they could move against the original document panel. The transporting device transports the first carriage 2 and the second carriage 3 in order that the image information of the original document is read through from one end to the other.

The lens 4 projects the image information received from the second carriage 3 onto the CCD sensor 5 by focusing on it.

The image information projected onto the CCD sensor 5 is converted into an electrical signal, and is sent as an image signal to an image processing board (not shown) via the reading apparatus control board 6.

Additionally, the image reading apparatus also includes a white shading panel 11 and an original document panel glass 12.

Referring to FIG. 2, operation of the image reading apparatus will be outlined below.

The image reading apparatus is actuated upon powering on the image forming apparatus. The image reading apparatus is switched into a copying mode and an initialization process is carried out at a specified magnification for image reading (Step S1).

Then, a copying process is started (Step S2). Upon starting the copying process, an image reading process of the original document is started (Step S3). When the first carriage 2 and the second carriage 3 are transported to an end of the image of the original document, the image reading process is completed (Step S4), and the first carriage 2 and the second carriage 3 are transported to the point where the image reading started; i.e. the far left end of the original document panel glass (Step S5).

Meanwhile, the speed for reading the original image varies depending on the number of paper to be read per minute and the magnification for image reading. Accordingly, the first carriage 2 and the second carriage 3 are transported at a given speed corresponding to the specified magnification or the like in order to read the image of the original document.

When the image of the original document is read at a variable magnification, the scanning speed of the transporting device is changed. For example, when the image is read at a reduction of 25% in contrast with the 100% reading, the scanning speed for reading the image is quadrupled in relation to that of the 100% reading.

As a driving motor of the transporting device which scans the first carriage 2 and the second carriage 3, a control motor, a stepping motor or the like is used. Since this driving motor cannot cover the entire range of magnification (e.g. 50-400%), the magnification range is divided into a plurality of levels and the scanning speed is adjusted in accordance with each magnification range. That is, switching of excitation in the driving motor is carried out in accordance with the respective magnification range.

The scanning speed of the first carriage 2 and the second carriage 3 is changed by means of the change in the rotational speed of the driving motor. In concrete terms, it is carried out by switching of excitation, however, when the rotational speed of the driving motor is changed gradually, there may a case in which the frequency of the driving motor coincides with the resonance frequency. If resonant is occurred between the frequency of the driving motor and the resonance frequency, there will be a fluctuation of the rotation of the driving motor, resulting in a blurred image. As a measure to control the fluctuated rotation of the driving motor, an inertial body is employed. When the resonance frequency exists within the specified magnification range, the inertial body is attached to the rotary shaft of the driving motor so that the inertial body would rotate together with the shaft as a linked unit, thus enabling a shift of the resonance frequency. Consequently, the deterioration of the image (the blurred image) is prevented.

An example of known arrangements in which an inertial body is attached to the rotary shaft of the driving motor is described below.

In the Japanese Patent Laid Open No. 8-63041 "ROTATING BODY DRIVING DEVICE FOR IMAGE FORMING DEVICE", a plurality of inertial bodies which is attached to a rotary shaft of a rotating body (a driving motor) is used for shifting the resonance frequency. In concrete terms, based on the information from a detection means concerning the change in the image forming speed and the like, an inertial mass adjusting means switches the operation to make the integral rotation of the inertial body with the rotary shaft possible or impossible, causing a shift of the resonance frequency.

Another means read in the same publication uses a division type inertial body attached to the rotary shaft of the rotating body. In concrete terms, based on the information from a detection means concerning the change in the image forming speed or the change of the natural frequency of the driving system, an inertial body diameter adjusting means properly displaces the division type inertial bodies in a radial direction, thereby enabling a shift of the resonance frequency.

However, the prior art described above has the following problems.

Although the inertial body which is attached to the rotary shaft of the driving motor aiming at causing a shift of the resonance frequency of the driving motor is effectively used for a certain range of magnification, it may not be effective for other ranges of magnification. For example, when resonance occurs in the range of 50-99% where the excitation is divided into four ranges such as 25-49%, 50-99%, 100-199% and 200-400%, an inertial body is attached to the rotary shaft of the driving motor having the inertial force corresponding to the subject range. When this inertial body rotates together with the driving motor as a linked unit, the resonance frequency can be shifted to another range, thereby preventing the deterioration of the image in the range of 50-99%.

However, although the resonance frequency can be shifted in the excitation phase in which switching of excitation of the driving motor is not carried out, in other magnifications or other excitation phases there may be a case that the resonance frequency band cannot be shifted. For example, if the resonance frequency, which originally existed in the range of 50-99%, has been shifted to the range of 100-199% by adding an inertial body, the resonance frequency now exists in the range of 100-199%. This causes resonance to occur in the magnification range of 100-199% to which the resonance frequency is shifted, resulting in the image deterioration (the blurred image) in this range.

In order to solve the above mentioned problems, a control measures may be used to increase the number of divisions of the excitation band of the driving force so that the resonance frequency phase can be shifted. However, this measures causes an increases in control memory and system memory of firmware, thereby possibly imposing a restriction on other functions. Additionally, although an increased number of divisions enable the shift of the resonance frequency, it also causes an increase in the number of step corners in the driving motor which will cause cogging. Consequently, vibration is added to the rotation of the driving motor, resulting in the deterioration of the image.

Moreover, when a mechanism involves a plurality of inertial bodies being attached to the rotary shaft of the driving motor in order to change the inertial force, such problems as friction between the rotary shaft and the inertial bodies and odd sound may be caused even when the inertial bodies do not rotate because of the coaxial structure.

Where the inertial force is calculated from the formula: F=volume (.$\times r^2 \times 1 \times$sp.gr.)$\times$radius$\times$radius/2, the inertial force is proportional to the square of the radius (distance between the rotary shaft and the center of gravity). This means that the inertial force largely depends upon the size of the radius. In other words, displacement of the inertial force in the direction of an axis or of the weight thereof does not substantially contribute to the change in the inertial force.

Furthermore, when the inertial body carries out positioning using a magnet or positioning pins and dowels, and rotates together with the rotary shaft as a linked unit, vibration and impact as a result of attaching process causes the tip of the image to move, therefore resulting in the image deterioration. In order to solve this problem, some buffering measures has to be taken to alleviate the impact caused by the attaching process.

SUMMARY OF THE INVENTION

The present invention has been accomplished in view of the above problem, and it is an object of the invention to provide a rotating driving apparatus and an image reading apparatus capable of solving a problem of the blurred image by providing a control on the fluctuation of the rotation of the rotating body.

The rotating driving apparatus and the image reading apparatus according to the present invention have been accomplished by utilizing a characteristic that the inertial load is proportional to the square of the position (radius) of the inertial body attached to the rotary shaft. In concrete terms, in order to solve the problem of the blurred image, which is possibly caused in such cases as a latent image forming, and a visible image transferring to a sheet of paper, an inertial load changing device has been provided to which an inertial body(s) adjacently disposed which is suitably attached to the rotating body of the rotating mechanism.

BEST MODE FOR CARRING OUT THE INVENTION

THE FIRST EMBODIMENT

The first embodiment of a rotating driving apparatus and an image reading apparatus according to the present invention will be explained below. In the following description, it is assumed that a rotating driving apparatus is incorporated into an image forming apparatus, and the image forming apparatus is incorporated into a copying machine. The copying machines are device for forming and transferring an image onto paper by the reversal development system based on the image information of the original document to be copied. On these copying machines, an explanation will be made herein especially for an image reading apparatus.

Figure 1:
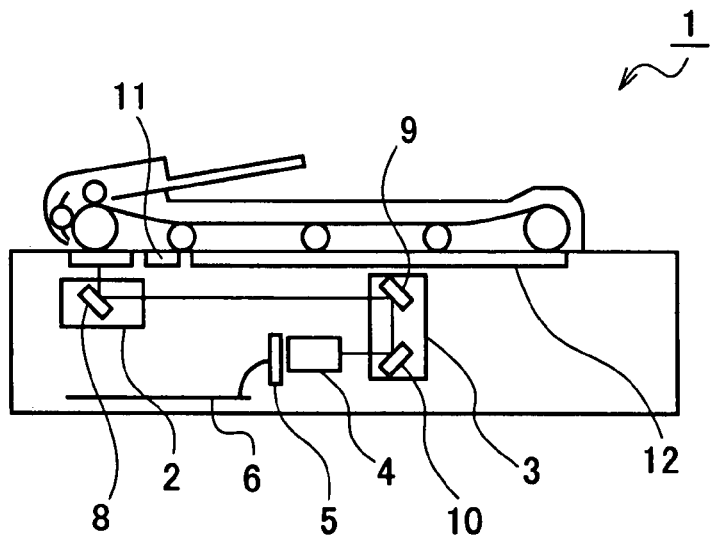
FIG. 1 is a schematic lateral view showing a conventional image reading apparatus.
Figure 2:
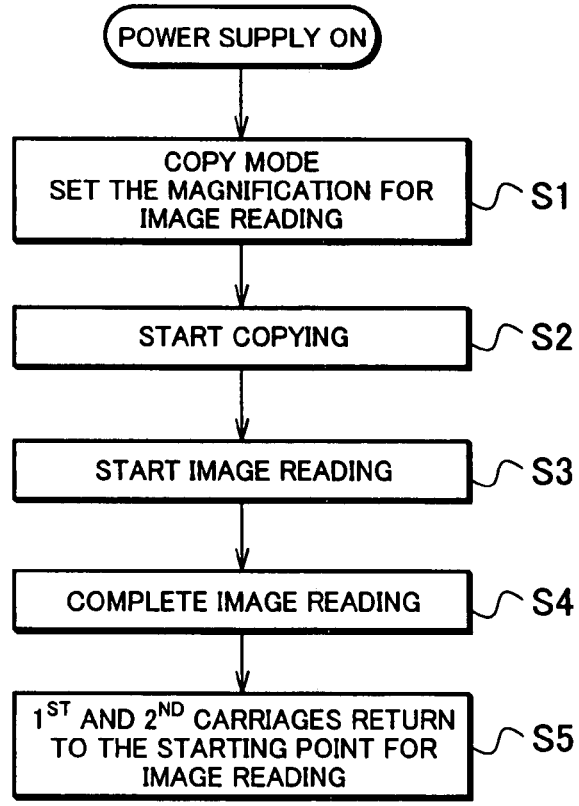
FIG. 2 is a flow chart showing an operation of a conventional image reading apparatus.

Since the overall structure of the image reading apparatus according to the present invention is almost identical to the conventional image reading apparatus shown in FIG. 1, a description thereof will be abbreviated, by just providing the same symbols to the corresponding members. A driving system of the image reading apparatus has the following structure.

Figure 3:
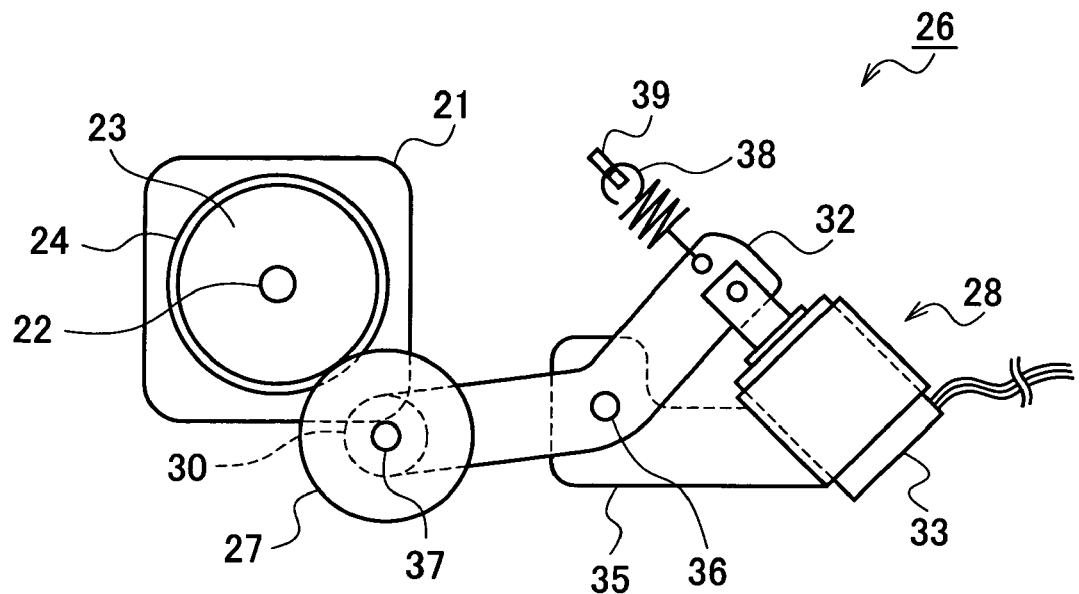
FIG. 3 is a front view showing an inertial load changing device according to the first embodiment of the present invention, in a condition in which a first inertial body is detached from a second inertial body.
Figure 4:
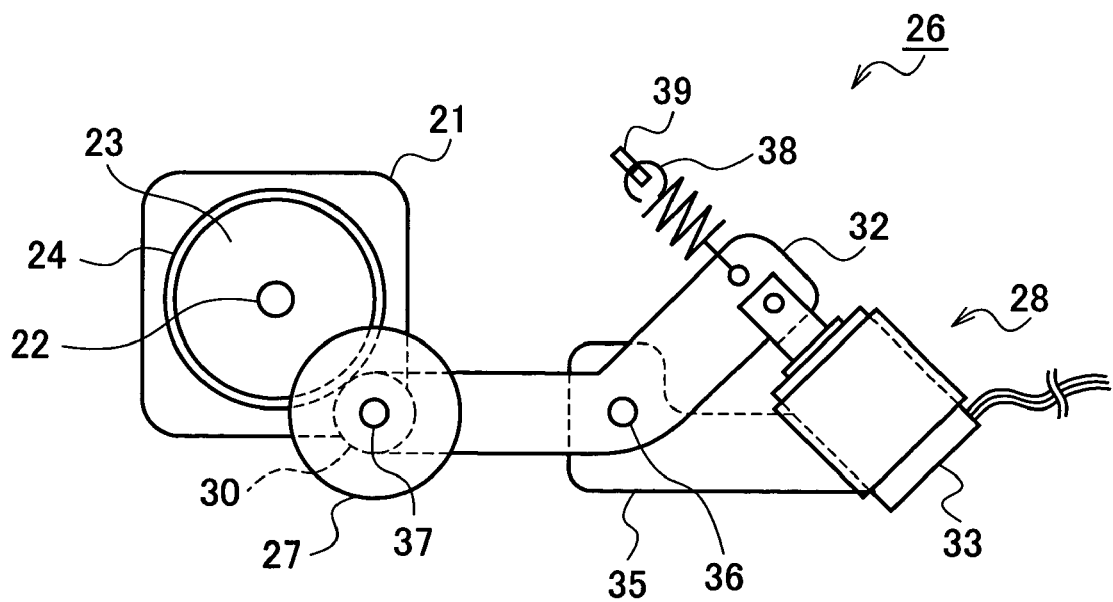
FIG. 4 is a front view showing an inertial load changing device according to the first embodiment of the present invention, in a condition in which the first inertial body is attached to the second inertial body.

In reading an image of the original document, a transporting device is driven by a driving motor 21 served as a driving device shown in FIG. 3 and FIG. 4. The driving motor 21 is provided with a motor pulley (not shown) attached to the rotary shaft. The driving motor 21 has an excitation switching function, by which the rotating speed of the driving motor can be changed by way of switching of excitation.

A wire (not shown) is disposed on the transporting device in the direction in which the first carriage 2 and the like moves, and the first carriage 2 and a second carriage 3 are fixed to this wire. One end of the wire is hung over to a driving pulley (not shown). Also a driving belt (not shown) is hung over between this driving pulley and the motor pulley of the driving motor 21. In this construction, when the driving pulley is driven by the driving motor 21, the first carriage 2 and the second carriage 3 are moved towards the direction of scanning via the wire.

On the rotary shaft 22 of the driving motor 21, an orbicular first inertial body 23 is disposed as a rotating body. The first inertial body 21 is designed to be thin with a large diameter. The first inertial body 23 assures a stable rotation of the driving motor 21 in the initial stage. The first inertial body 23 is provided with a gear portion 24 on the outer circumference so that it engages with a gear portion 30 of the second inertial body, which will be described later.

By the side of the driving motor 21 an inertial load changing device 26, which changes the inertial load of the first inertial body 23, is disposed. The inertial load changing device 26 is provided for changing the inertial load of the first inertial body 23 by shifting the resonance frequency in accordance with switching of excitation in the driving motor 21. The inertial load changing device 26 comprises a second inertial body 27 which is adjacently disposed to the first inertial body 23 attached to the rotary shaft of the driving motor 21, and an interlock unit 28 which supports the second inertial body 27 so that the second inertial body 27 could rotate and move at right angles to the rotary shaft 22 in order to rotate the first inertial body 23 as a linked unit so as to change the inertial load of the first inertial body 23.

The second inertial body 27 is a member for changing the inertial load of the first inertial body 23 as appropriate. The second inertial body 27 is designed to be thin with a large diameter. The large diameter is employed because the inertial force is proportional to the square of the radius. The second inertial body 27 is designed thin in order to reduce the weight thereof so that the load to be imposed on the driving motor 21 should be reduced when the rotating speed of the driving motor 21 is constant (steady-state). In this construction, although the inertial body 27 imposes a large load on the driving motor 21 when it tries to change its rotating speed, it imposes smaller load when the rotating speed is constant. For the same reason described above, the first inertial body 23 is also designed thin having a large diameter.

The second inertial body 27 is provided with the gear portion 30 on one side. The gear portion 30 is designed to engage with the teeth portion 24 on the outer circumference of the first inertial body 23, so that the first inertial body 23 and the second inertial body 27 rotate together as a linked unit. The gear portion 30 is designed smaller than the diameter of the second inertial body 27 in order to impose a larger inertial load on the first inertial body 23. In concrete terms, the larger the diameter of the second inertial body 27 is and the smaller the diameter of the gear portion 30 is, the larger the gear ratio as well as the inertial load become. Further, as the gear ratio increases, the second inertial body 27 rotates at a higher speed. Accordingly, even when the rotating speed of the driving motor 21 is changed slightly, the rotating speed of the second inertial body 27 changes to a large extent, thereby obtaining a large inertial load to achieve the constant rotation of the driving motor 21 (the first inertial body 23). Moreover, as the diameter and/or mass of the second inertial body 27 are increased, the inertial load increases. Accordingly, the diameter and the gear ratio (and the mass in some case) of the second inertial body 27 should be decided in accordance with the extent of the resonance frequency of the driving motor 21 to be shifted.

An interlock unit 28 is a device for attaching the second inertial body 27 to the first inertial body 23 and for rotating them as a linked unit in order to cause a change in the inertial load of the first inertial body 23. The interlock unit 28 comprises a crank 32 and an electromagnetic solenoid 33.

The crank 32 is a member for rotatably supporting the second inertial body 27 so that the second inertial body 27 could be attached to and detached from the first inertial body 23 as appropriate. The crank 32 is formed in to a L-shape, and it is swingably supported at the center by a mounting bracket 35 on the body side using a cramp pin 36. At the tip end of the crank 32 the second inertial body 27 is rotatably attached using a supporting shaft 37. At the base end of the crank 32, the electromagnetic solenoid 33 is attached. On one end of the crank 32 to which direction it rotates, the electromagnetic solenoid 33 is disposed (lower right in FIG. 3). On the other end of the direction to which the crank 32 rotates is a spring 38 is disposed. One end of the spring 38 is hung over to the crank 32, and the other end to a spring hook 39, which is disposed on the body side. In the above construction, the crank 32 is usually pulled by the spring 38 leftward in the figure, that is, the crank 32 is being pulled in the direction to which the second inertial body 27 is detached from the first inertial body 23.

The electromagnetic solenoid 33 is a member, which suitably rotates the crank 32 in order that the second inertial body 27 is attached to and detached from the first inertial body 23. When the rotating speed of the first inertial body 23 became steady-state in accordance with switching of excitation the electromagnetic solenoid 33 is actuated before starting the image reading so that the second inertial body 27 is attached to the first inertial body 23. This process is taken because attachment is smoothly carried out after the steady-state is achieved. In other words, if they are attached before the rotating speed is changed, it will take a considerable time for the first inertial body 23 to complete changing the rotating speed because of the large inertial load of the second inertial body 27. On the other hand, if they are attached with each other after the steady-state is achieved, notwithstanding of a fluctuated rotation temporarily caused by attachment, the first inertial body 23 will easily resume the steady-state upon reading. Thus, the second inertial body 27 is designed to be attached to the first inertial body 23 after achieving the steady-state and before reading images. Also, a third inertial body 42 of a second embodiment, which will be described later, is attached in the same way as mentioned above.

The tip end of the electromagnetic solenoid 33 (the tip of the rotary shaft) is rotatably attached to one end of the crank 32. The base end of the electromagnetic solenoid 33 is swingably supported by the mounting bracket 35. The shaft of the electromagnetic solenoid 33, which is usually extended, is pulled into its body so as to swing the crank 32 in order to change the inertial load of the first inertial body 23, thereby enabling the gear portion 30 to engage with the teeth portion 24 and the second inertial body 27 to be attached to the first inertial body 23.

The driving motor 21 and the electromagnetic solenoid 33 are controlled by a control unit (not shown). The control unit, which is provided with a control function shown in FIG. 5, controls the image reading apparatus.

Figure 5:
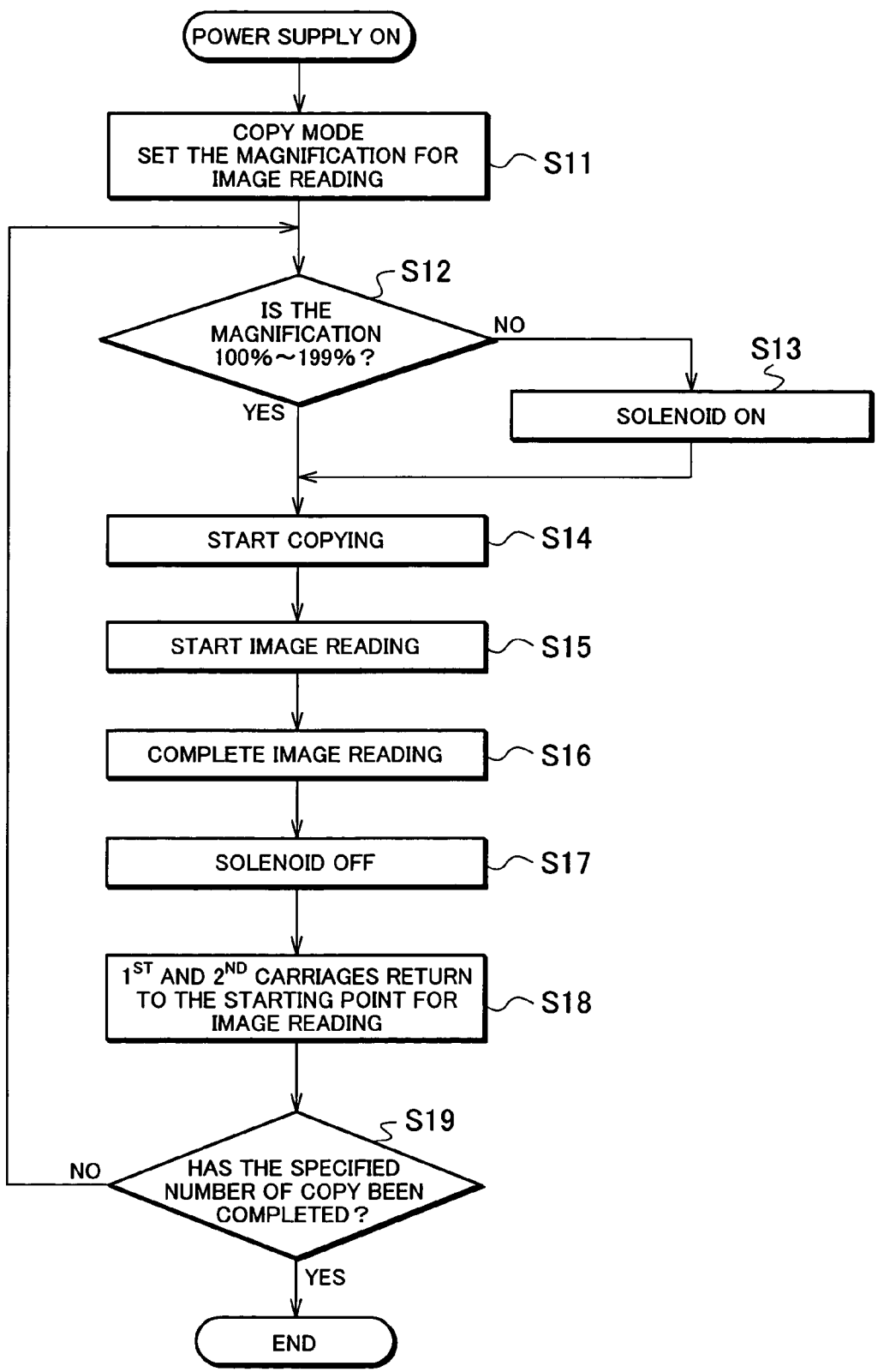
FIG. 5 is a flow chart showing an operation of an image reading apparatus according to the first embodiment of the present invention.

Now referring to the flow chart FIG. 5, an operation of the image reading apparatus in the above construction will be explained below. It is assumed here that the resonance frequency is shifted by the first inertial body 23 and exists in the magnification range for image reading other than the range of 100-199%.

Powering on the image forming apparatus actuates the image reading apparatus.

An operator specifies a copy mode on the control panel and sets the reading magnification and the number of copies to make. By this operation the control unit switches the image reading apparatus into the copy mode and starts the initialization in the specified magnification (Step S11). In concrete terms, the driving motor 21 is started in order to transport the first carriage 2 and the second carriage 3 to the starting position for image reading at the left end of the document glass, which is the base point for image scanning. Also, switching of excitation is carried out in the driving motor 21 in accordance with the specified magnification for image reading.

Then, the specified magnification for image reading is checked if it is in the range of 100-199% (Step S12). If it is determined that the specified magnification is not in the range 100-199%, that is, it is in the range where the resonance frequency could not be shifted by the first inertial body 23 attached to the driving motor 21 (25-49%, 50-99%, 200-400%), the electromagnetic solenoid 33 is powered of, thereby actuating the interlock unit 28 (Step S13). The shaft of the electromagnetic solenoid 33 is usually extended being pulled by the spring 28, in which condition the second inertial body 27 is detached from the second inertial body 23. If the electromagnetic solenoid 33 is powered on under this condition, the shaft thereof is pulled into the body of the electromagnetic solenoid 33 so that the gear portion 30 of the second inertial body 27 is engaged with the teeth portion 24 of the first inertial body 23. Thus the second inertial body 27 is attached to the first inertial body 23 causing an increase in the inertial load of the first inertial body 23, accordingly shifting the resonance frequency to outside the specified magnification range for image reading. Then, the copying process is started (Step S14).

Meanwhile, if it is determined that the specified magnification is in the range of 100-199%, that is, if it is in the range in which the resonance frequency thereof has been shifted to outside the range by the first inertial body 23 attached to the driving motor 21, the copying process is started, instead of actuating the interlock unit 28 (Step S14) because it is not necessary to attach the second inertial body 27 to the first inertial body 23 in order to impose an inertial load, Upon starting the copying process, the driving motor 21 is actuated in order to transport the first carriage 2 and the second carriage 3 at the scanning speed for the specified magnification, thereby starting an image reading of the original document (Step S15). In this operation, a constant rotation of the driving motor 21 could be achieved by arbitrarily attaching the second inertial body 27 to the first inertial body 23, and the first carriage 2 and the second carriage 3 are precisely moved for image reading. When the first carriage 2 and the second carriage 3 reached to the end of the original document, the image reading process is completed (Step S16) and the electromagnetic solenoid 33 is powered off (Step S17). The crank 32 is thus pulled by the spring 28, thereby detaching the second inertial body 27 from the first inertial body 23.

In the next step, the first carriage 2 and the second carriage 3 are moved to the starting position for image reading at the left end of the document glass, which is the base point for image scanning (Step S18).

Then, it determines whether the specified number of copies has been completed (Step S19). If it is not completed, the routine returns to the above mentioned steps S12-18. Upon completion, the operation is terminated.

In the above operation, the resonance frequency can be shifted to outside the specified magnification range for image reading so that the fluctuated rotation of the driving motor (image movement) can be surely prevented.

The Second Embodiment

The second embodiment of the rotating driving apparatus and the image reading apparatus according to the present invention will be explained below. Since the overall structure of the image reading apparatus according to the present embodiment is similar to that of the image reading apparatus according to the first embodiment, the following description deals only with characteristics thereof according to the present embodiment.

The present embodiment is characterized that a plurality of inertial bodies with different diameters are suitably attached to the first inertial body 23 respectively by the interlock units so that the inertial load of the first inertial body 23 could be changed into a plurality of ranges.

When the excitation switching is divided into a plurality of ranges (e.g. 25-49%, 50-99%, 100-199%, 200-400%), generally an addition of a single inertial load changing device 26 will be able to shift the resonance frequency to outside the specified range for image reading, as in the case of the first embodiment mentioned above. However, for various kinds of image reading apparatus with different sizes and performances and the like, it is difficult to shift all the resonance frequencies to outside the specified range for image reading only by a single inertial load changing device 26.

Figure 6:
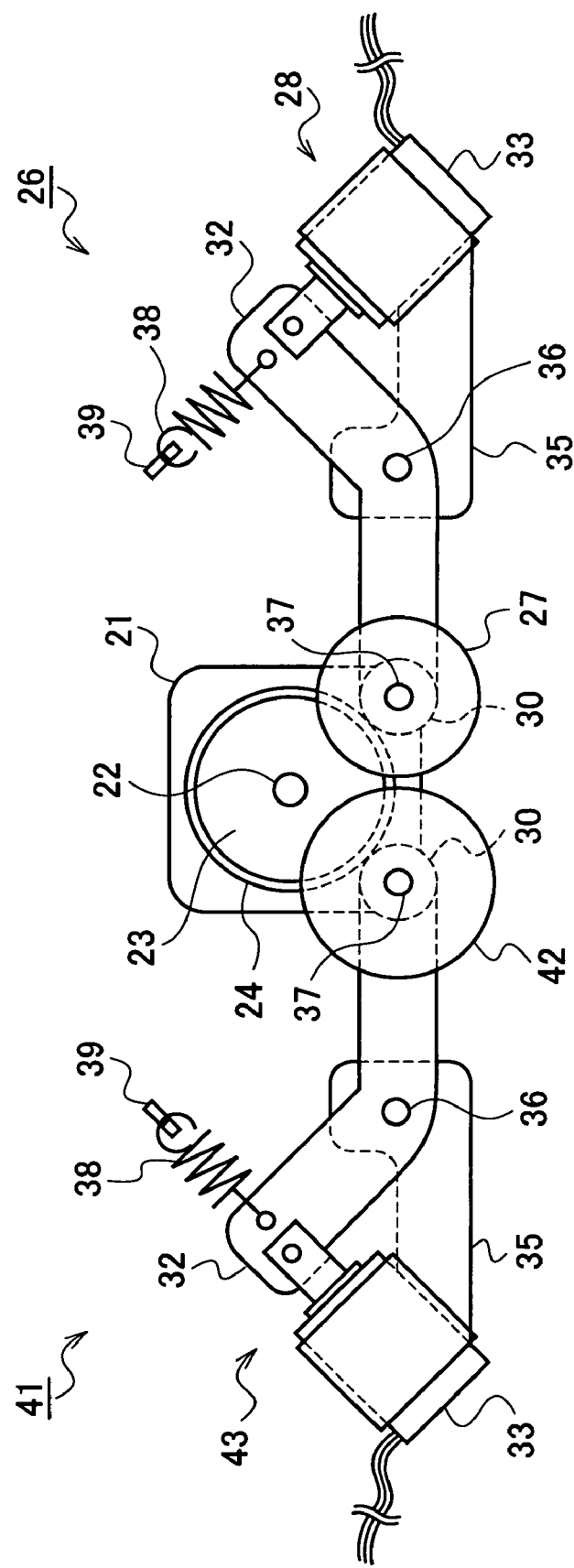
FIG. 6 is a front view showing an inertial load changing device according to the second embodiment of the present invention.

As a measure, a plurality of inertial load changing device are provided in order to change the inertial load of the first inertial body 23 in various ranges. An example of the case is shown in FIG. 6, in which two inertial load changing device are provided.

By the side of the driving motor 21, the inertial load changing device 26 and 41 are disposed in order to change the inertial load of the first inertial body 23. The construction of the first inertial load changing device 26 is almost the same as the inertial load changing device 26 in the first embodiment.

The second inertial load changing device 41 is a device serving as a complementary unit to the inertial load changing device 26, in case it is difficult to shift the resonance frequency to outside the specified range for image reading by the inertial load changing device 26 alone when switching of excitation of the driving motor 21 is carried out.

The construction of the second inertial load changing device 41 is almost the same as that of the inertial load changing device 26. The inertial load changing device 41 comprises a third inertial body 42 which is adjacently disposed to the first inertial body 23 attached to the rotary shaft 22 of the driving motor 21, and the interlock unit 43, which supports the third inertial body 42 so that it would rotate and move at right angles to the rotary shaft 22, in order to rotate the first inertial body 23 as a linked unit so as to change the inertial load of the first inertial body 23.

The third inertial body 42 is a member for changing the inertial load of the first inertial body 23 by way of a suitable attachment. The third inertial body 42 is designed to be thin with a large diameter, as in the second inertial body 27. The concrete sizes thereof are determined in terms of the relationship of the inertial load changing device 26 with the second inertial body 27. The third inertial body 42 is used in three patterns of the combination; the second inertial body 27 or the third inertial body 42 is attached to the first inertial body 23 respectively, or they are attached to the first inertial body 23 all together. Accordingly, the size of the second inertial body 27 and the third inertial body 42 is set so that the inertial load by the combination to be used would be sufficient to shift the resonance frequency to outside the specified range for image reading.

The constructions of other members (a gear portion 30, a crank 32, an electromagnetic solenoid 33 and a sprig 28) are similar to those of the inertial load changing device 26 in the first embodiment described above. A control unit (not shown) which controls the driving motor 21 and the electromagnetic solenoid 33 is provided with a control function shown in the flowchart of FIG. 7, thus controlling the image reading apparatus.

Figure 7:
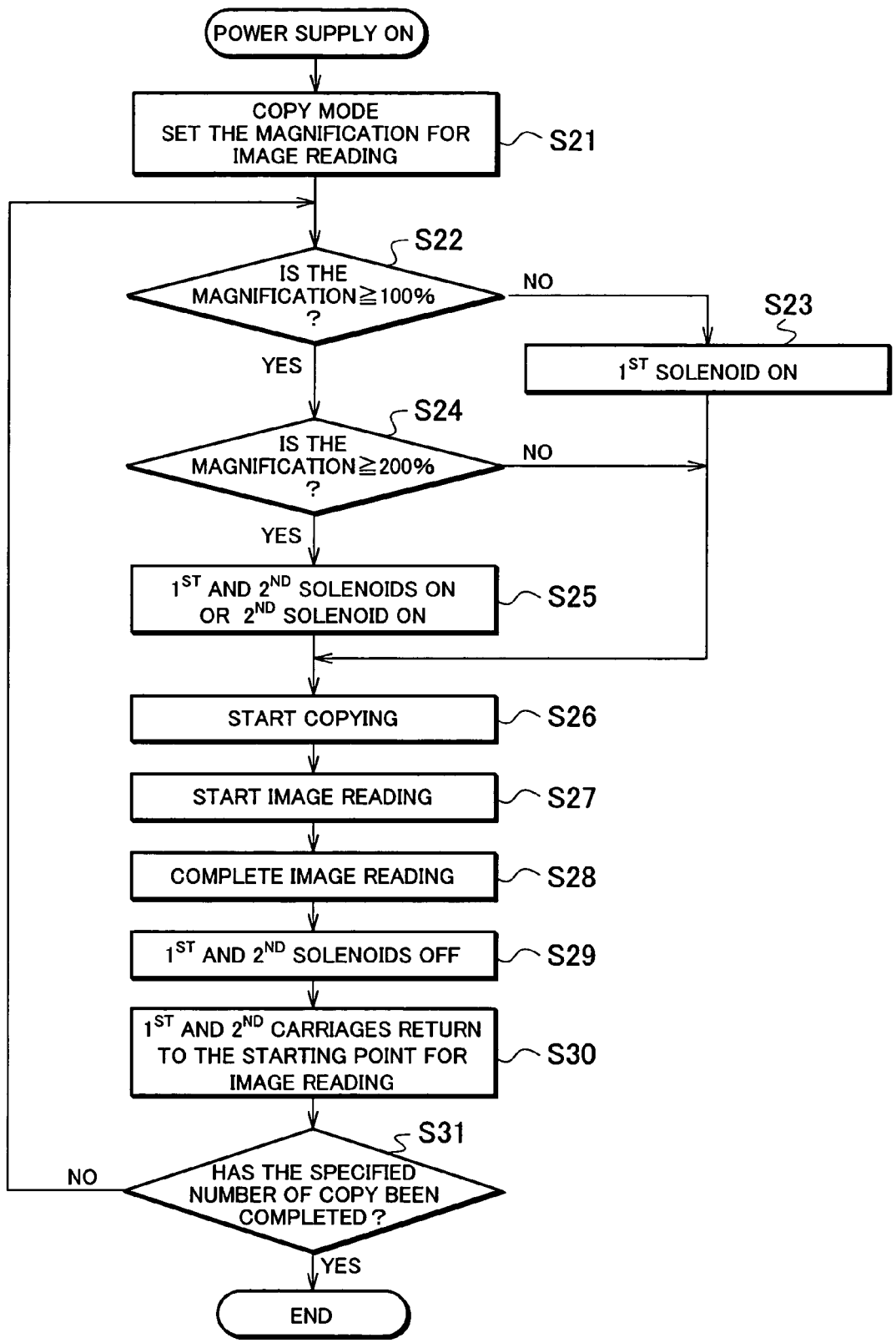
FIG. 7 is a flow chart showing an operation of the image reading apparatus according to the second embodiment of the present invention.

Referring to the flow chart FIG. 7, an operation of the image reading apparatus constructed as in the above will be explained below. In this explanation, it is assumed that the resonance frequency exists in the magnification ranges for image reading of equal to or less than 100% and of equal to or greater than 200%. Also, the first inertial load changing device 26 is designed to be actuated in the range for image reading of equal to or less than 100%, and the second inertial load changing device 41 in the range of image reading of equal to or greater than 200%.

Powering on the image reading apparatus starts the operation. An operator specifies a copy mode on the control panel and sets a reading magnification and the number of copies to make. By this operation, the control unit switches the image reading apparatus into the copy mode and starts the initialization in the specified magnification (Step S21).

Then, the specified magnification for image reading is checked if it is in the range of equal to or greater than 100% (Step S22). If it is determined that the specified magnification is not in the range of equal to or greater than 100%, that is, it is in the range of equal to or less than 100% where the first inertial load changing device 26 can handle, the electromagnetic solenoid 33 of the first inertial load changing device 26 is powered on, thereby actuating the interlock unit 28 (Step S23). The shaft of the electromagnetic solenoid 33 is then pulled into its body so that the gear portion 30 of the second inertial body 27 is engaged with the teeth portion 24 of the first inertial body 23, thereby interlocking the second inertial body 27 with the first inertial body 23. The attachment of the second inertial body 27 to the first inertial body 23 causes an increase in the inertial load of the first inertial body 23 resulting in a shift of the resonance frequency to outside the specified magnification range for reading. The copying process is then started (Step S26).

Meanwhile, if it is determined that the magnification is specified equal to and greater than 100%, it further checks whether the magnification is equal to and greater than 200% (Step S24). If it determines that the magnification is not equal to and greater than 200%, that is, it is in the range of 100-199% in which the resonance frequency does not exist, the copying process is started (Step S26).

When it is determined that the magnification is specified equal to and greater than 200%, that is, it is in the range of 200-400%, the electromagnetic solenoid 33 of the first inertial load changing device 26 and the second inertial load changing device 41 are powered on respectively, thereby actuating the interlock unit 28 and 43 (Step S25). The shafts of the electromagnetic solenoids 33 are now pulled into their bodies so that the gear portions 30 of the second inertial body 27 and the third inertial body 42 (in some case, the third inertial body 42 alone) are engaged with the teeth portion 24 of the first inertial body 23 respectively, causing the second inertial body 27 and the third inertial body 42 to be attached to the first inertial body 23. The attachment of the second inertial body 27 and the third inertial body 42 to the first inertial body 23 causes an increase in the inertial load of the first inertial body 23, thus enabling a shift of the resonance frequency to outside the specified magnification range for image reading. The copying process is then started (Step S26).

Upon starting the copying process, the driving motor 21 is actuated in order to move the first carriage 2 and the second carriage 3 at the scanning speed for the specified magnification, thereby starting the image reading of the original document (Step S27). In this operation, the constant rotation of the driving motor 21 could be achieved by arbitrarily attaching the second inertial body 27 and the third inertial body 42 to the first inertial body 23, and the first carriage 2 and the second carriage 3 are precisely moved for image reading. When the first carriage 2 and the second carriage 3 reached to the end of the original document, the image reading operation is completed (Step S28) and the electromagnetic solenoids 33 of the first inertial body 26 and the second inertial body 41 are powered of f respectively (Step S29). The cranks 32 are now pulled by the springs 28, thereby enabling the second inertial body 27 and the third inertial body 42 to be detached from the first inertial body 23.

The first carriage 2 and the second carriage 3 are moved to the starting position for image reading at the left end of the document glass, which is the base point for image scanning (Step S30).

Then, it determines whether the specified number of copies has been completed (Step S31). If it is not completed, the routine returns to the above mentioned steps S22-30. Upon completion, the operation is terminated.

In the above operation, the resonance frequency could be shifted to outside the specified range for image reading, thereby surely preventing the fluctuation of the rotation of the driving motor (the blurred image).

Modifications

The present invention is applicable particularly, but not exclusively to a rotating driving apparatus and an image reading apparatus incorporated into a copying machine as explained in the above embodiments. For example, the present invention may be applied not only to the driving motor 21 of the image reading apparatus but also to other rotary bodies. The present invention may be applied to any rotating body to prevent the fluctuation of the rotation thereof, as long as it is used by causing a change in the rotational rate, and also the resonance frequency exists in the subject rotation range and which needs to be eliminated.

In an image forming apparatus incorporated into a copying machine, the present invention may be applied to a rotating body which is used by causing a change in the rotational rate such as a transferring drum, a paper feeding roller and so forth.

The applications also include a printer, a facsimile machine and as well as a copying machine.

In the second embodiment, although two inertial load changing device are disposed in order to change the inertial load of the first inertial body 23, the number of the inertial load changing device may be increased to more than three. The number of the inertial load changing device is determined in accordance with the load of the inertial force. When more than two inertial load changing device are disposed, the diameters thereof may be set the same or different. When a plurality of inertial bodies is used, the inertial load can be varied in several levels (into the number of combinations of the inertial bodies) by making appropriate combinations thereof.

In the above mentioned embodiments, although a gear is used as a means for attaching the first inertial body 23 and the second inertial body 27 (and the third inertial body 42), such gear may be substituted by other means such as a belt and a friction gear and so forth. When a belt is used, a groove serving as a pulley is provided in place of the teeth portion 24 of the first inertial body 23, and another pulley in place of the gear portion 30 of the second inertial body 27. The belt is loosely hung between these pulleys which adjust the tension of the belt to cause the inertial bodies to attach to and detach from each other. When a friction gear is used, a flat surface is provided in place of the teeth portion 24 of the first inertial body 23 so as to increase the frictional resistance. Similarly, a friction gear having a flat outer circumference is provided in place of the gear portion 30 so as to increase the friction resistance.

The use of the belt or the friction gear also benefits in minimizing the impact caused by attachment.

In the above mentioned embodiments, although the first inertial body 23 and the second inertial body 27 are adjacently disposed so that the shafts thereof would be positioned parallel with each other, it is also possible that these inertial bodies are disposed so that the shafts could be attached at an angle of 90 degree or another. In this case, a bevel gear corresponding to the set angle is used as an attaching device. A friction gear in the shape of an umbrella may be also used.

Figure 8:
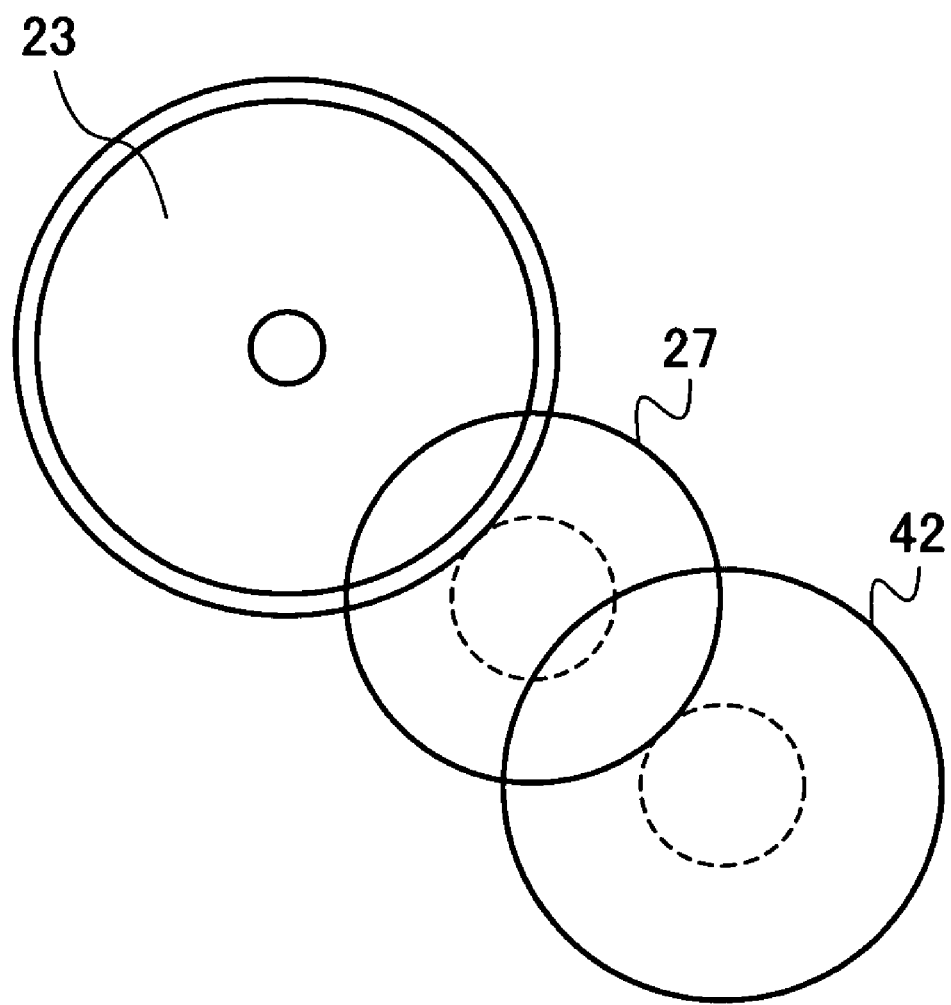
FIG. 8 is a schematic front view showing a modification of the present invention.

In the second embodiment, although two inertial bodies (the second inertial body 27 and the third inertial body 42) are individually disposed on the circumference of the first inertial body 23, these inertial bodies may be also disposed so that the third inertial body 42 is attached to the second inertial body 27 as shown in FIG. 8. This disposition is more effective than the case in FIG. 6 because of the larger gear rate to be obtained. Also, it is possible to add more than three inertial bodies.

In the above embodiments, although the first inertial body 23 is attached to the rotary shaft of the driving motor 21, it may be also attached indirectly by way of a gear and the like.

Furthermore, the inertial load changing device may be incorporated into a follower device of the driving motor 21 such as a follower (including a transferring drum, a paper feeding roller and so forth) driven by the driving motor 21. In this case also, the same action and effect as in the above embodiments can be obtained.

What is claimed is:

1. An image reading apparatus provided with a scanning device that scans and reads an original document which is placed on an original document panel, a transporting device that transports said scanning device, and a driving device that drives said transporting device, which is capable of changing the rotational speed, comprising:
    an inertial load changing device that changes the inertial load of the rotating body disposed at said driving device, wherein
    the inertial load changing device further comprises an inertial body which is adjacently disposed to said rotating body of said driving device, and an interlock unit which attaches said inertial body to said rotating body so as to cause an integral rotation in order to change the inertial load of said rotating body.

2. The rotating driving apparatus according to claim 1, wherein a plurality of inertial bodies of said inertial load changing device is provided which is individually attached to said rotating body by said interlock unit as appropriate so as to change the inertial load of said rotating body in a plurality of levels.

3. The image reading apparatus according to the claim 1, wherein said interlock unit changes the inertial load of said rotating body in accordance with a specified magnification for image reading.

4. A rotating driving apparatus provided with a rotating body that changes a rotational speed, comprising:
    an inertial load changing device that changes the inertial load of said rotating body, wherein
    the inertial load changing device further comprises an inertial body which is adjacently disposed to the rotating body, and an interlock unit which attaches said inertial body to said rotating body so as to cause an integral rotation in order to change the inertial load of said rotating body.

5. The rotating driving apparatus according to claim 4, wherein a plurality of inertial bodies of said inertial load changing device is provided which is individually attached to said rotating body by said interlock unit as appropriate so as to change the inertial load of said rotating body in a plurality of levels.

6. The rotating driving apparatus according to claim 4, wherein the interlock unit of said inertial load changing device includes a crank which is rotatably supported and simultaneously supports said inertial body at a tip end thereof, and an electromagnetic solenoid which is disposed to the base end of said crank in order to attach said inertial body to said rotating body as appropriate by swinging the crank so as to change the inertial load of the rotating body.

7. The rotating driving apparatus according to claim 6, wherein said electromagnetic solenoid is actuated after the rotational rate of said rotating body has achieved a steady-state as switching of excitation is carried out so as to attach said inertial body to said rotating body.

* * * * *